(12) United States Patent
Wang et al.

(10) Patent No.: US 11,039,422 B2
(45) Date of Patent: Jun. 15, 2021

(54) LOAD MANAGER PERFORMANCE MANAGEMENT FOR 5G OR OTHER NEXT GENERATION NETWORK

(71) Applicant: AT&T Intellectual Property I, L.P., Atlanta, GA (US)

(72) Inventors: Xiaoyi Wang, Austin, TX (US); Ralf Bendlin, Cedar Park, TX (US); Arunabha Ghosh, Austin, TX (US); Andrew Thornburg, Austin, TX (US); Salam Akoum, Austin, TX (US); Thomas Novlan, Cedar Park, TX (US); Milap Majmundar, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 42 days.

(21) Appl. No.: 16/245,635

(22) Filed: Jan. 11, 2019

(65) Prior Publication Data

US 2020/0229141 A1 Jul. 16, 2020

(51) Int. Cl.
*H04W 72/02* (2009.01)
*H04W 8/24* (2009.01)
(Continued)

(52) U.S. Cl.
CPC ............. *H04W 72/02* (2013.01); *H04W 8/24* (2013.01); *H04W 72/0453* (2013.01); *H04W 72/1205* (2013.01); *H04W 88/04* (2013.01)

(58) Field of Classification Search
CPC ............. H04W 72/02; H04W 72/0453; H04W 72/1205; H04W 8/24; H04W 88/04
See application file for complete search history.

(56) References Cited

U.S. PATENT DOCUMENTS 8,385,931 B2  2/2013  Landstom et al.
8,582,638 B2  11/2013  Earnshaw et al.
(Continued)

FOREIGN PATENT DOCUMENTS

CN  107872888 A  4/2018
EP  3282719 A1  2/2018
(Continued)

OTHER PUBLICATIONS

Apostolaras et al., "Evolved User Equipment for Collaborative Wireless Backhauling in Next Generation Cellular Networks", URL: http://nitlab.inf.uth.gr/NITlab/papers/[Apostolaras [SECON15][Evolved%20UEs].pdf, 12th Annual IEEE International Conference on Sensing, Communication, and Networking (SECON), IEEE, 2015, 9 pages.
(Continued)

*Primary Examiner* — Rhonda L Murphy
(74) *Attorney, Agent, or Firm* — Amin, Turocy & Watson, LLP

(57) ABSTRACT

To increase network efficiency, a user equipment (UE) can be appointed as a local manager to coordinate the allocation of resources used by other UEs. For example, the network can promote the UE as a local manager and assign the local manager a resource pool. The local manager can then broadcast synchronization signals to let the other UEs associate themselves with the local manager. After the other UEs are synced with the local manager, the local manager can allocate resources to the other UEs. Based on report data regarding the local managers management procedures, the network can maintain the UE as the local manager or demote the UE from local manager status.

20 Claims, 12 Drawing Sheets

(51) Int. Cl.
*H04W 72/04* (2009.01)
*H04W 72/12* (2009.01)
*H04W 88/04* (2009.01)

(56) References Cited

U.S. PATENT DOCUMENTS

| | | | |
|---|---|---|---|
| 8,682,376 | B2 | 3/2014 | Franceschini et al. |
| 9,351,310 | B2 | 5/2016 | Lagerqvist et al. |
| 9,370,001 | B2 | 6/2016 | Kim et al. |
| 9,391,736 | B2 | 7/2016 | Nayeb Nazar et al. |
| 9,450,714 | B2 | 9/2016 | Hwang et al. |
| 9,756,653 | B2 | 9/2017 | Kim et al. |
| 9,768,942 | B2 | 9/2017 | Golitschek Edler von Elbwart et al. |
| 9,844,071 | B2 | 12/2017 | Ostergaard et al. |
| 10,111,246 | B2 | 10/2018 | Zhang et al. |
| 10,159,061 | B2 * | 12/2018 | Zhao ................ H04W 56/002 |
| 10,165,556 | B2 | 12/2018 | Chu et al. |
| 10,595,363 | B2 | 3/2020 | Wang et al. |
| 2011/0134827 | A1 | 6/2011 | Hooli et al. |
| 2012/0044890 | A1 | 2/2012 | Jen |
| 2012/0287844 | A1 | 11/2012 | Ophir et al. |
| 2013/0195026 | A1 | 8/2013 | Johnsson et al. |
| 2013/0208653 | A1 | 8/2013 | Morioka et al. |
| 2013/0322413 | A1 | 12/2013 | Pelletier et al. |
| 2014/0036704 | A1 | 2/2014 | Han et al. |
| 2014/0078971 | A1 | 3/2014 | Bontu et al. |
| 2014/0171062 | A1 * | 6/2014 | Fallgren ................ H04W 40/22 455/422.1 |
| 2014/0177540 | A1 | 6/2014 | Novak et al. |
| 2014/0177586 | A1 | 6/2014 | Jang et al. |
| 2014/0256369 | A1 | 9/2014 | Ji et al. |
| 2014/0335866 | A1 | 11/2014 | Velde et al. |
| 2015/0146633 | A1 | 5/2015 | Kalhan |
| 2015/0181587 | A1 | 6/2015 | Yang et al. |
| 2015/0271755 | A1 | 9/2015 | Karri et al. |
| 2016/0205714 | A1 | 7/2016 | Morita et al. |
| 2016/0295565 | A1 | 10/2016 | Kim et al. |
| 2016/0345167 | A1 | 11/2016 | Li et al. |
| 2016/0374051 | A1 | 12/2016 | Morita |
| 2017/0006586 | A1 | 1/2017 | Gulati et al. |
| 2017/0013466 | A1 | 1/2017 | Xu et al. |
| 2017/0026997 | A1 | 1/2017 | Moulsley |
| 2017/0048905 | A1 | 2/2017 | Yun et al. |
| 2017/0064731 | A1 | 3/2017 | Wang et al. |
| 2017/0086028 | A1 | 3/2017 | Hwang et al. |
| 2017/0086114 | A1 | 3/2017 | Jung et al. |
| 2017/0134080 | A1 | 5/2017 | Rahman et al. |
| 2017/0135105 | A1 | 5/2017 | Li et al. |
| 2017/0201461 | A1 | 7/2017 | Cheng et al. |
| 2017/0208568 | A1 | 7/2017 | Nam et al. |
| 2017/0245245 | A1 | 8/2017 | Kim et al. |
| 2017/0273094 | A1 | 9/2017 | Cheng et al. |
| 2017/0280469 | A1 | 9/2017 | Park et al. |
| 2017/0289733 | A1 | 10/2017 | Rajagopal et al. |
| 2017/0295601 | A1 | 10/2017 | Kim et al. |
| 2017/0331670 | A1 | 11/2017 | Parkvall et al. |
| 2017/0339676 | A1 | 11/2017 | Belghoul et al. |
| 2017/0353971 | A1 | 12/2017 | Gupta et al. |
| 2017/0366311 | A1 | 12/2017 | Iyer et al. |
| 2018/0007606 | A1 | 1/2018 | Lee et al. |
| 2018/0035435 | A1 | 2/2018 | Gupta et al. |
| 2018/0041956 | A1 | 2/2018 | Abraham et al. |
| 2018/0042023 | A1 | 2/2018 | Sheng |
| 2018/0049084 | A1 | 2/2018 | Lee et al. |
| 2018/0049219 | A1 | 2/2018 | Gupta et al. |
| 2018/0049274 | A1 | 2/2018 | Kim et al. |
| 2018/0069928 | A1 | 3/2018 | Martin et al. |
| 2018/0070369 | A1 | 3/2018 | Papasakellariou |
| 2018/0076839 | A1 | 3/2018 | Baghel et al. |
| 2018/0092122 | A1 | 3/2018 | Babaei et al. |
| 2018/0124574 | A1 | 5/2018 | Byun et al. |
| 2018/0184270 | A1 * | 6/2018 | Chun ................ H04W 92/18 |
| 2018/0192405 | A1 | 7/2018 | Gong et al. |
| 2018/0199317 | A1 | 7/2018 | Hwang et al. |
| 2018/0213554 | A1 | 7/2018 | Zeng et al. |
| 2018/0220398 | A1 | 8/2018 | John et al. |
| 2018/0220415 | A1 | 8/2018 | Yin et al. |
| 2018/0227942 | A1 | 8/2018 | Hwang et al. |
| 2018/0227949 | A1 | 8/2018 | Tiirola et al. |
| 2018/0234973 | A1 | 8/2018 | Lee et al. |
| 2018/0359773 | A1 | 12/2018 | Tesanovic et al. |
| 2019/0068996 | A1 | 2/2019 | Ananthanarayanan et al. |
| 2019/0246421 | A1 | 8/2019 | Zhou et al. |
| 2020/0022089 | A1 | 1/2020 | Guo |
| 2020/0029318 | A1 | 1/2020 | Guo |
| 2020/0092685 | A1 | 3/2020 | Fehrenbach et al. |
| 2020/0106566 | A1 | 4/2020 | Yeo et al. |
| 2020/0120458 | A1 * | 4/2020 | Aldana ................ H04W 28/22 |

FOREIGN PATENT DOCUMENTS

| | | |
|---|---|---|
| KR | 20180039472 A | 4/2018 |
| WO | 2016106713 A1 | 7/2016 |
| WO | 2017007104 A1 | 1/2017 |
| WO | 2017126266 A1 | 7/2017 |
| WO | 2017133646 A1 | 8/2017 |
| WO | 2017/162040 A1 | 9/2017 |
| WO | 2017164141 A1 | 9/2017 |
| WO | 2017/173133 A1 | 10/2017 |
| WO | 017173133 A1 | 10/2017 |
| WO | 2017171528 A1 | 10/2017 |
| WO | 2017171909 A1 | 10/2017 |
| WO | 2017176097 A1 | 10/2017 |
| WO | 2017/196215 A1 | 11/2017 |
| WO | 2018031623 A1 | 2/2018 |
| WO | 2018/059701 A1 | 4/2018 |
| WO | 2018/062948 A1 | 4/2018 |
| WO | 2018/064179 A1 | 4/2018 |
| WO | 2018062454 A1 | 4/2018 |
| WO | 2018067400 A1 | 4/2018 |
| WO | 2018/080568 A1 | 5/2018 |
| WO | 2018/084520 A1 | 5/2018 |
| WO | 2018080629 A1 | 5/2018 |
| WO | 2018084590 A1 | 5/2018 |
| WO | 2018/113947 A1 | 6/2018 |
| WO | 2018112322 A2 | 6/2018 |
| WO | 2018/145067 A1 | 8/2018 |
| WO | 2018/147996 A1 | 8/2018 |
| WO | 2018139892 A1 | 8/2018 |
| WO | 2018144899 A1 | 8/2018 |
| WO | 2019/177783 A1 | 9/2019 |

OTHER PUBLICATIONS

Tullberg et al., "Metis System Concept: The Shape of 5G to Come", URL: https://pdfs.semanticscholar.org /f0cb/be302eed502ff98acdf557649ce23c21c111.pdf, IEEE Communications Magazine, 2015, 13 pages.

Non-Final Office Action received for U.S. Appl. No. 15/923,958 dated Apr. 15, 2019, 39 pages.

International Search Report and Written Opinion for International Application Serial No. PCT/US2019/020150 dated Jun. 5, 2019, 17 pages.

International Search Report and Written Opinion received for International Application Serial No. PCT/US2020/012269 dated Apr. 17, 2020, 18 pages.

AT&T: "Resource allocation mechanism", 3GPP Draft; R1-1812872 Resource Allocation Mechanism, 3rd Generation Partnership Project (3GPP), Mobile Competence Centre; 650, Route Des Lucioles; F-06921 Sophia-Antipolis Cedex; France, vol. RAN WG1, No. Spokane, USA; Nov. 12, 2018-Nov. 16, 2018, Nov. 11, 2018 (Nov. 11, 2018), XP051554834, Retrieved from the Internet: URL:http://www.3gpp.org/ftp/Meetings%5F3GPP%5FSYNC/RAN1/Docs/R12D1812872%2Ezip [retrieved on Nov. 11, 2018] sections 1-6.

AT&T: "Sidelink based synchronization mechanism, 3GPP Draft; R1-1809068 Sidelink Based Synchronization Mechanism, 3rd Generation Partnership Project (3GPP), Mobile Competence Centre ; 650, Route Des Lucioles ; F-06921 Sophia-Antipolis Cedex; France, vol. RAN WGI, No. Gothenburg, Sweden; Aug. 20, 2018-Aug. 24,

(56) References Cited

OTHER PUBLICATIONS

2018, Aug. 11, 2018 (Aug. 11, 2018), XP051516438, Retrieved from the Internet:URL:http://www.3gpp.org/ftp/tsg%5Fran/WG1%5FRL1/TSGR1%5F94/Docs/R1%2D1809068%2Ezip [retrieved on Aug. 11, 2018] sections 1-6."
Non-Final Office Action received for U.S. Appl. No. 16/366,347 dated Jun. 8, 2020, 63 pages.
Final Office Action received for U.S. Appl. No. 15/923,958 dated Sep. 6, 2019, 49 pages.
Non-Final Office Action received for U.S. Appl. No. 16/004,811 dated Nov. 25, 2019, 43 pages.
Final Office Action received for U.S. Appl. No. 15/923,958 dated Jun. 25, 2020, 48 pages.
Non-Final Office Action received for U.S. Appl. No. 15/923,958 dated Feb. 26, 2020, 40 pages.
5G Americas, "V2X Cellular Solutions," http://www.5gamericas.org/files/2914/7769/1296/5GA_V2X_Report_FINAL_for_upload.pdf, Last Accessed: May 23, 2018, 37 pages.
"Ruckebusch, Peter, et al. ""WiSHFUL: Enabling Coordination Solutions forManaging Heterogeneous Wireless Networks."" IEEE Communications Magazine55.9 (2017): 118-125. 9 pages. https://biblio.ugent.be/publication/8541159/file/8541162.pdf".
"Zervas, Georgios, et al. ""Service-oriented multigranular optical networkarchitecture for clouds."" IEEE/OSA Journal of Optical Communications andNetworking 2.10 (2010): 883-891. 9 pages. http://repository.essex.ac.uk/3757/1/05594024.pdf".
"Sykora, J., et al. ""Cooperative strategies and networks."" Cooperative radiocommunications for green smart environments. Gistrup: River Publishers (2016). 34 pages. https://pdfs.semanticscholar.org/912f/4ab9c15ce35c16e9569c5680ff471fd0cb1c.pdf".
"Madueno, German Corrales, et al. ""Deliverable D2. 5 Report on 5G evolution (third revision)."" Project: H2020-ICT-688712, Ver. 1.0, Mar. 2018. 83 pages. https://www.triangle-project.eu/wp-content/uploads/2018/04/TRIANGLE_Deliverable_D2-5.pdf".
"Friedman, Larry ""SimpliciTI: simple modular RF network specification."" Update(2007): 1-03. 34 pages. http://vip.gatech.edu/wiki/images/a/ad/SimpliciTI+Specification.pdf".
Non-Final Office Action received for U.S. Appl. No. 16/366,254 dated Jul. 21, 2020, 50 pages.
International Preliminary Report on Patentability received for PCT Application Serial No. PCT/US2019/020150 dated Oct. 1, 2020, 11 pages.
Non-Final Office Action received for U.S. Appl. No. 15/923,958 dated Dec. 15, 2020, 56 pages.
Final Office Action received for U.S. Appl. No. 16/366,347 dated Dec. 24, 2020, 44 pages.
Final Office Action received for U.S. Appl. No. 15/923,958 dated Mar. 12, 2021, 60 pages.

\* cited by examiner

LOAD MANAGER PERFORMANCE MANAGEMENT FOR 5G OR OTHER NEXT GENERATION NETWORK

TECHNICAL FIELD

This disclosure relates generally to facilitating performance management for a load manager of a wireless network. For example, this disclosure relates to facilitating load management for a mobile device for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to load manager performance management is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
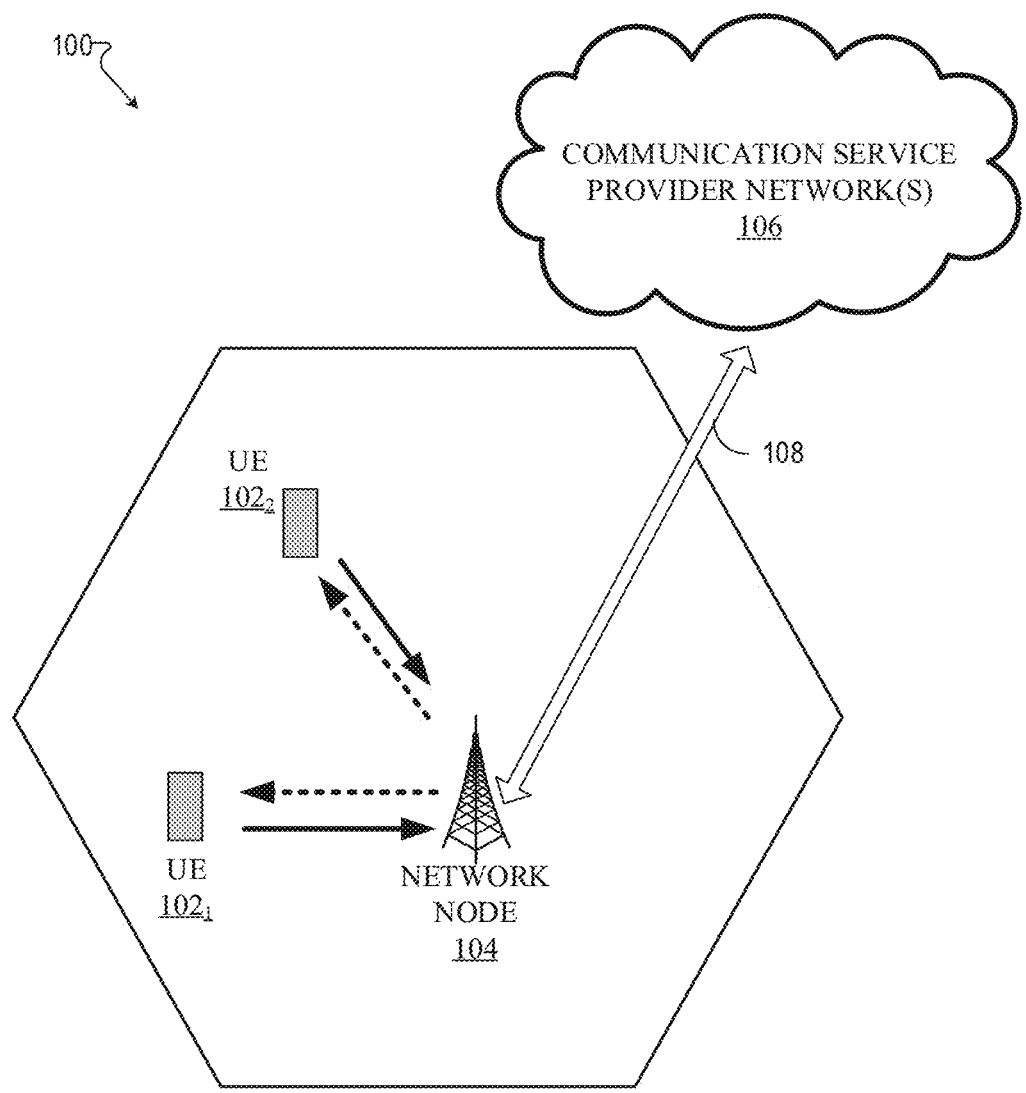
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate load manager performance management for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate load manager performance management for a 5G network. Facilitating load manager performance management for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

This disclosure discusses methods and systems to supervise local manager scheduling results. For example, a UE can be appointed as a local manager to coordinate the allocation of resources used by other UEs. The network can promote a UE as a local manager and assign the local manager a resource pool. The local manager can then broadcast synchronization signals to let other UEs associate themselves with the local manager. The other UEs can then sync up with the local manager and access to it by sending a scheduling request (SR). In response to receiving the SR, the local manager can schedule radio resource to the other UEs. If a UE does not receive any scheduling decision from the local manager, then the UE can re-send the SR if needed. If, after a defined amount of time, and/or a number of failed SR attempts, and the UE still does not receive a scheduling decision from that local manager, or the UE did not receive sufficient resources allocated by local manager, then the UE can report to the network a complaint and/or status update concerning that local manager.

The complaint and/or status report can comprise the following information: UE's location information and/or trajectory, local manager identification (ID) (which UE did not reply to SR), receiving power of other local managers, requested resource quantity, allocated resource quantity, number of attempted SRs, and/or time duration during which no scheduling decision has been received by the UE.

Alternatively, if a threshold amount of complaints is received by the network and/or a threshold number of different UEs filing complaints, then the network can demote the local manager to a regular UE. At this point, the network can also make a decision to appoint another UE as local manager. This decision can also be based on a geography associated with a UE to be promoted to local manager in respect to other UEs. It should be noted that the demotion can be temporary (e.g., based on a time parameter and/or other network configuration) or can be permanent based on the threshold number of complaints, the number of distinct UEs complaining, and/or a severity of the complaints reported to the network.

In an alternate embodiment, periodically, the local manager can send a resource usage report back to network. The resource usage report can comprise: a quantity of scheduling requests received during a time duration, a quantity of scheduling decisions made and/or how many downlink control signals have been transmitted to associated UEs, the local manager's location information and/or trajectory, the number of resources assigned to each associated UE, metrics used for scheduling (e.g., channel state information (CSI), traffic volume, radio signal received power (RSRP), quality of service (QoS), etc.), number of UEs and or UE IDs associated with the local manager within a given time interval and/or within a giving geographic location, an estimated spectral efficiency, and/or traffic volume experienced by sidelink transmissions utilizing the local manager's resource pool.

In another embodiment, the network can compare the resource usage report from the local manger to any complaint and/or status report. During this comparison, the network can determine consistencies and inconsistencies in the data received from the local manager and any other associated UEs. The network can then use this data to determine if the current local manager should remain the local manager, whether the current local manager should be demoted, and/or whether another UE should be promoted to a local manager.

Management of the local manager's performance can ensure that the local manager is providing scheduling and resource allocation decisions, which meet the requirements set by the network. The "customer satisfaction" feature can allow the associated UEs to submit complaint when a local manager does not allocate sufficient amount of resources to it. Consequently feedback from both the local managers and associated UEs can enable the network to obtain a holistic view of the efficiency and fairness of the local manager's scheduling performance.

In one embodiment, described herein is a method comprising promoting, by a wireless network device comprising a processor, a first mobile device, of mobile devices, from being a non-management mobile device to being a management mobile device. The method can comprise, in response to the promoting, assigning, by the wireless network device to the first mobile device, a resource pool associated with a resource to be allocated to a second mobile device of the mobile devices. Additionally, based on a condition having been satisfied, the network can comprise, receiving, by the wireless network device from the second mobile device, indication data indicative of the condition being satisfied. Furthermore, in response to the receiving the indication data, the network can comprise demoting, by the wireless network device, the first mobile device from being the management mobile device to being the non-management mobile device.

According to another embodiment, a first mobile device facilitate, receiving capability data representative of a capability to manage mobile devices, comprising the first mobile device, of a wireless network. Based on the capability, the first mobile device can facilitate sending, by the first mobile device to the mobile devices other than the first mobile device, a synchronization signal to indicate the capability to the mobile devices. In response to the sending the synchronization signal, the first mobile device can facilitate receiving, from a second mobile device of the mobile devices, a scheduling request. Based on the scheduling request, the first mobile device can facilitate allocating a resource to the second mobile device. Furthermore, in response to the allocating the resource, the first mobile device can facilitate sending, to a network device of the wireless network, resource usage data associated with the resource.

According to yet another embodiment, described herein is a machine-readable storage medium that can perform the operations comprising assigning a management function to a mobile device of mobile devices of a wireless network, wherein the management function comprises a resource allocation function allowing the mobile device to allocate a resource of the wireless network to the mobile devices. The machine-readable storage medium can perform the operations comprising facilitating, by the mobile device, receiving indication data indicative of the condition being satisfied based on a condition associated with the resource allocation function being determined to have been satisfied. Additionally, based on the indication data, the machine-readable storage medium can perform the operations comprising removing the management function from the mobile device to prevent the mobile device from further management of the mobile devices.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
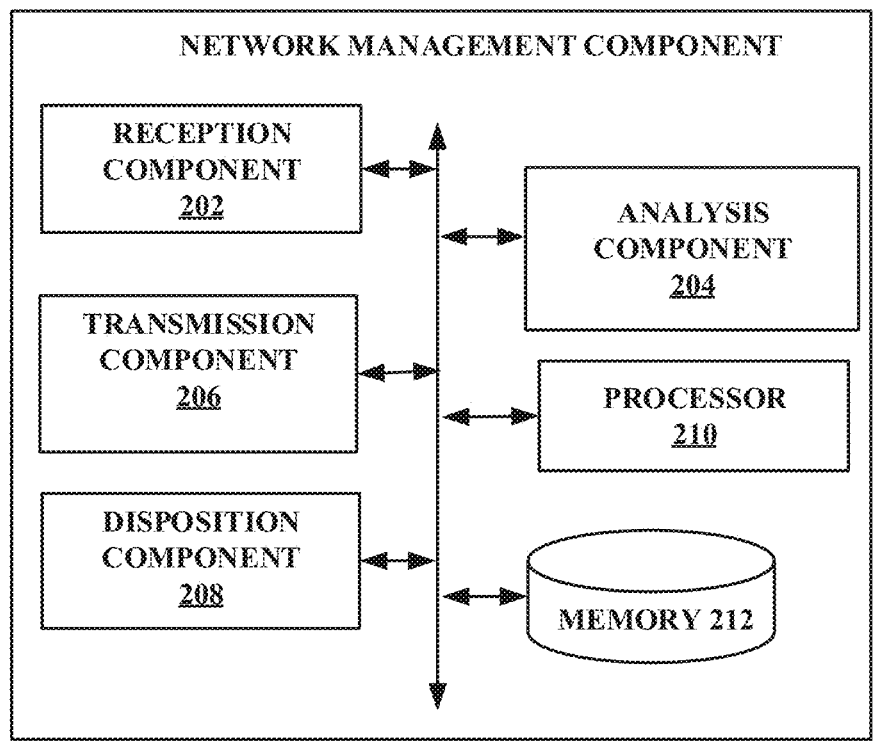
FIG. 2 illustrates an example schematic system block diagram of network management component according to one or more embodiments.

Referring now to FIG. 2, illustrated is an example schematic system block diagram of a network management component 200 according to one or more embodiments. The network management component 200, which can be hosted on the network, can comprise sub-components including but not limited to a reception component 202, an analysis component 204, transmission component 206, disposition component 208, a processor 210, and a memory 212. The reception component 202 can be configured to receive data from the UE $102_1$ and/or other UE $102_2$. For example, the reception component 202 can receive registration and/or connection data from the UE 102 to facilitate a wireless connection between the network node 104 and the UE 102. Aspects of the processor 210 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the disposition component 208. In an aspect, the disposition component 208 can also include memory 212 that stores computer executable components and instructions.

The network management component 200 can receive wireless signals from the UE 102, via the reception component 202 of the network management component 200. The transmission component 206 can transmit wireless signals to the UE 102. For example, the transmission component 206 can transmit a signal to the UE 102 to indicate that the UE 102 has been promoted to the status of a local manager based on an analysis performed by the analysis component 204. The analysis component 204 can analyze previous, current, and/or anticipated network conditions to facilitate the disposition component 208 in determining whether the UE 102 should be promoted or demoted to a local manager status. For example, if the network conditions do not justify promoting a particular UE 102 to a local manager, then the analysis component 204 can inform the disposition component 208 of such to prevent the UE 102 from being promoted as a local manager or maintaining the status of local manager.

Figure 3:
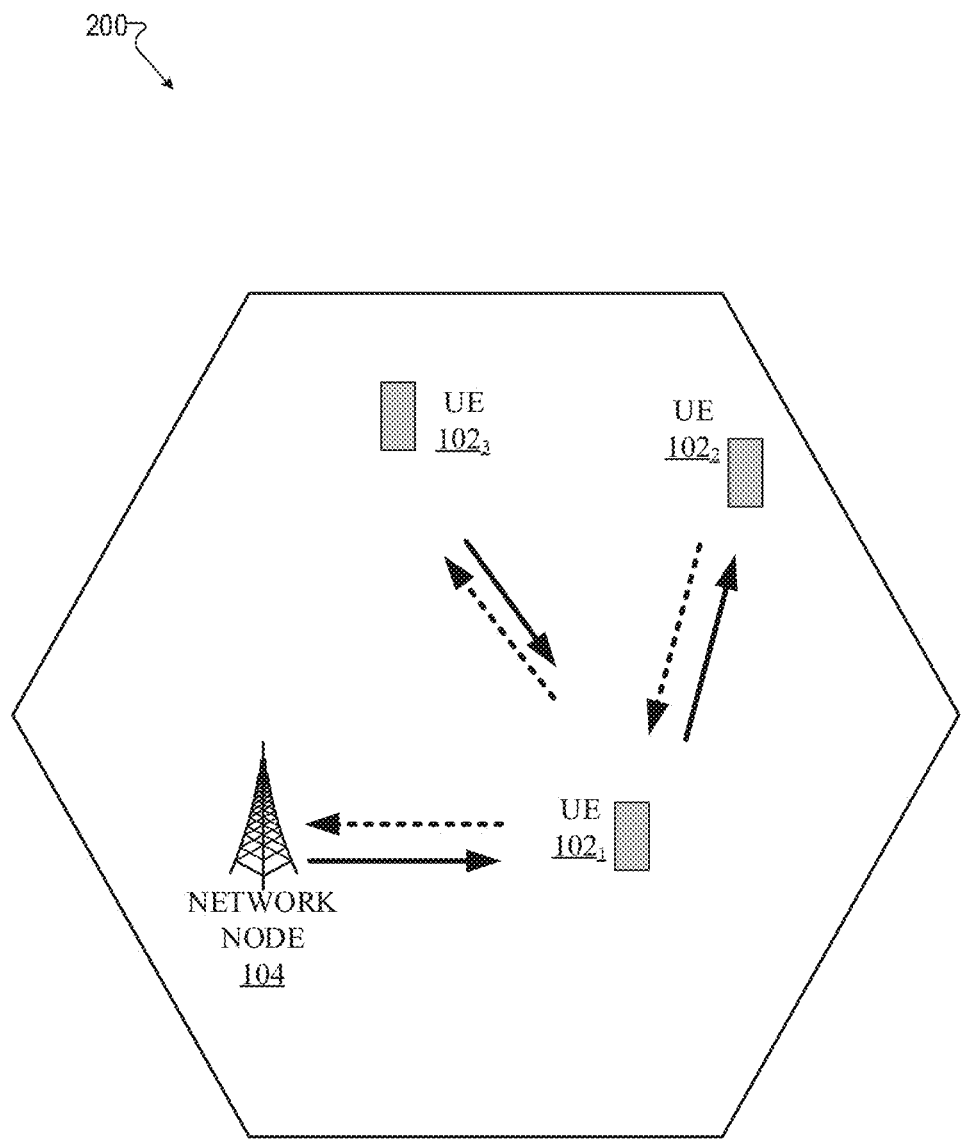
FIG. 3 illustrates an example wireless communication system in which a mobile device is promoted to a local manager according to one or more embodiments.

Referring now to FIG. 3, illustrated is an example wireless communication system 300 in which a mobile device is promoted to a local manager according to one or more embodiments. FIG. 3 depicts a scenario where the UE $102_1$ is promoted to a local manager by the network node 104. Therefore, the UE $102_1$ can provide resources to the other UEs $102_2$, $102_3$. For example, once the UE $102_1$ is promoted, it can send a synchronization signal out the UEs $102_2$, $102_3$ to indicate that the UE $102_1$ is available to allocate resources. Consequently, the UEs $102_2$, $102_3$ can send a scheduling request signal to the UE $102_1$ to request resources from the UE $102_1$. If the UEs $102_2$, $102_3$ do not receive the requested resources, then the UEs $102_2$, $102_3$ can report this data to the UE $102_1$.

Figure 4:
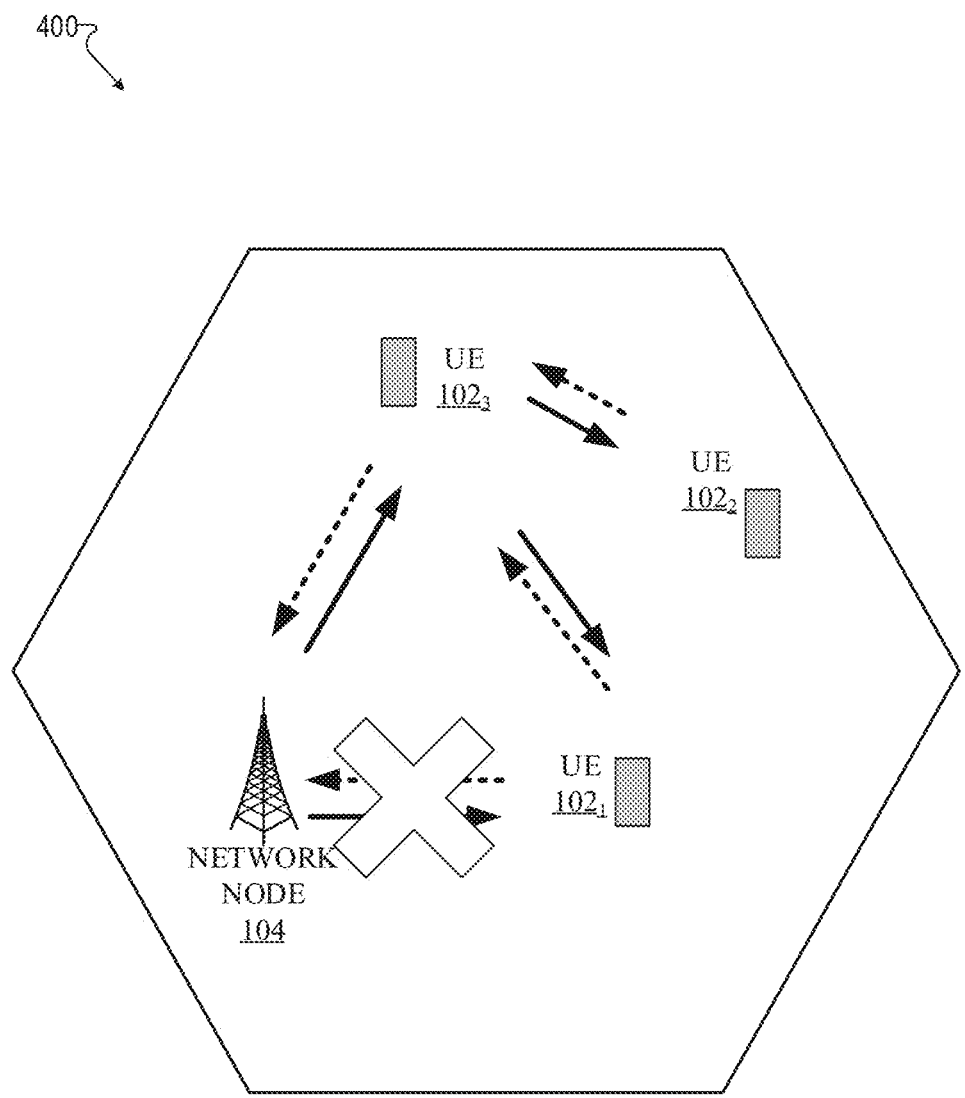
FIG. 4 illustrates an example wireless communication system in which a mobile device is demoted from a local manager and another mobile device is promoted to the local manager according to one or more embodiments.

Referring now to FIG. 4, illustrated is an example wireless communication system 400 in which a mobile device is demoted from a local manager and another mobile device is promoted to the local manager according to one or more embodiments. FIG. 4 depicts a scenario where the UE $102_1$ is demoted from a local manager by the network node 104. It should be noted that the "x" in the figure does not represent that the UE $102_1$ cannot communicate with the network node 104. Rather, it merely depicts the demotion procedure and still allows for communication between the network node 104 and the UE $102_1$. Therefore, the UE $102_1$ can no longer provide resources to the other UEs $102_2$, $102_3$. Alternatively, and in response to the UE 102 being demoted, the UE $102_3$ can be promoted. Thus, the UE $102_3$ can now send a synchronization signal out the UEs $102_1$, $102_2$ to indicate that the UE $102_3$ is available to allocate resources. Consequently, the UEs $102_2$, $102_1$ can send a scheduling request signal to the UE $102_3$ to request resources from the UE $102_3$. If the UEs $102_2$, $102_1$ do not receive the requested resources, then the UEs $102_2$, $102_1$ can report this data to the UE $102_3$ and/or the network node 104.

Figure 5:
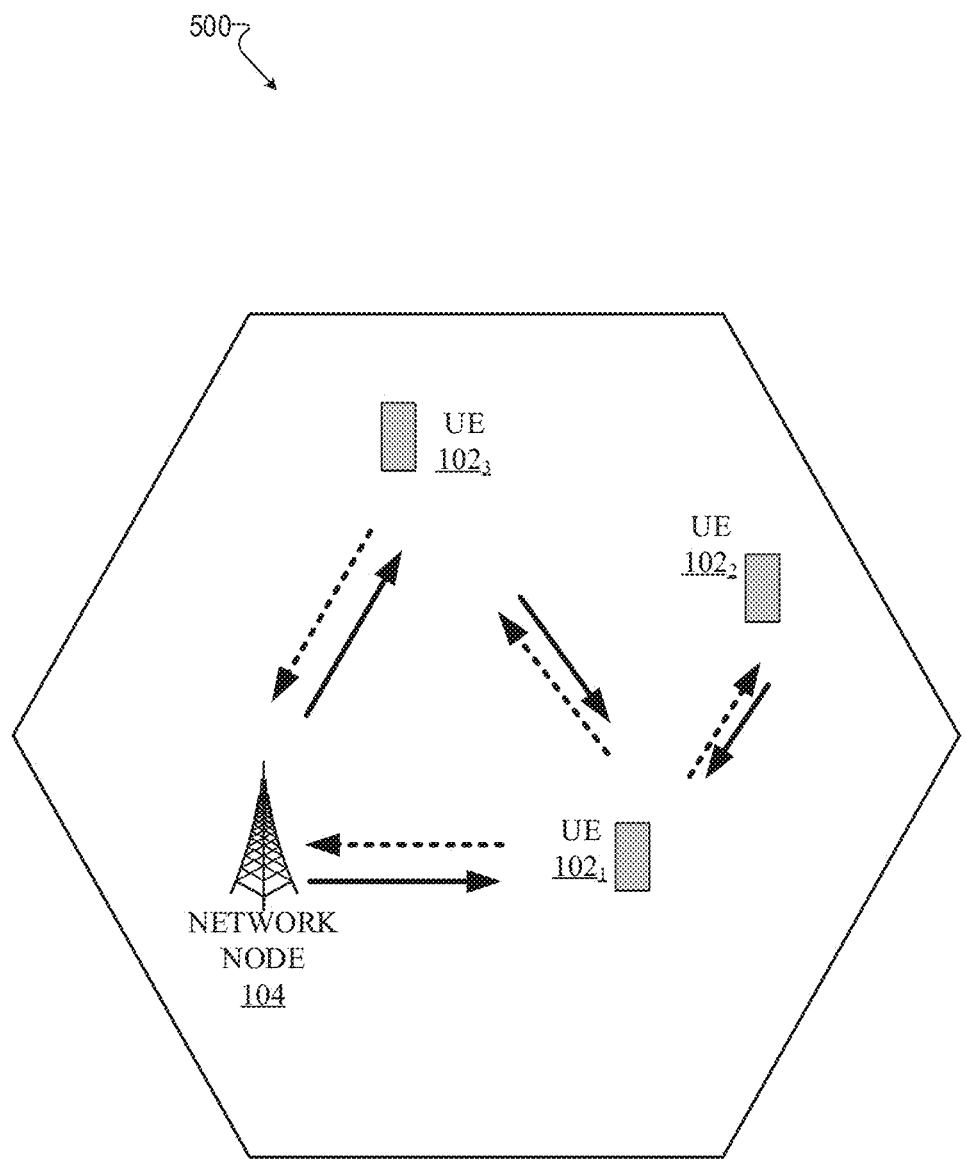
FIG. 5 illustrates an example wireless communication system in which a local manager send report data to the network and the associated mobile device also sends report data to the network according to one or more embodiments.

Referring now to FIG. 5 illustrates an example wireless communication system in which a local manager send report data to the network and the associated mobile device also sends report data to the network according to one or more embodiments. It should be noted that description of like elements are omitted for the sake of brevity.

FIG. 5 depicts a scenario similar to that of FIG. 3, wherein the UE $102_1$ is promoted to a local manager by the network node 104. However, in this scenario, if the UEs $102_2$, $102_3$ do not receive the requested resources, then the UEs $102_2$, $102_3$ can report this data to the UE $102_1$ and/or to the network node 104. Therefore, the network node 104 can receive report data from the UE $102_3$ and/or the UE $102_1$. Based on the report data, the disposition component 208 can determine whether or not to demote the UE $102_1$, and/or promote another UE $102_2$, $102_3$ to increase network efficiency.

Figure 6:
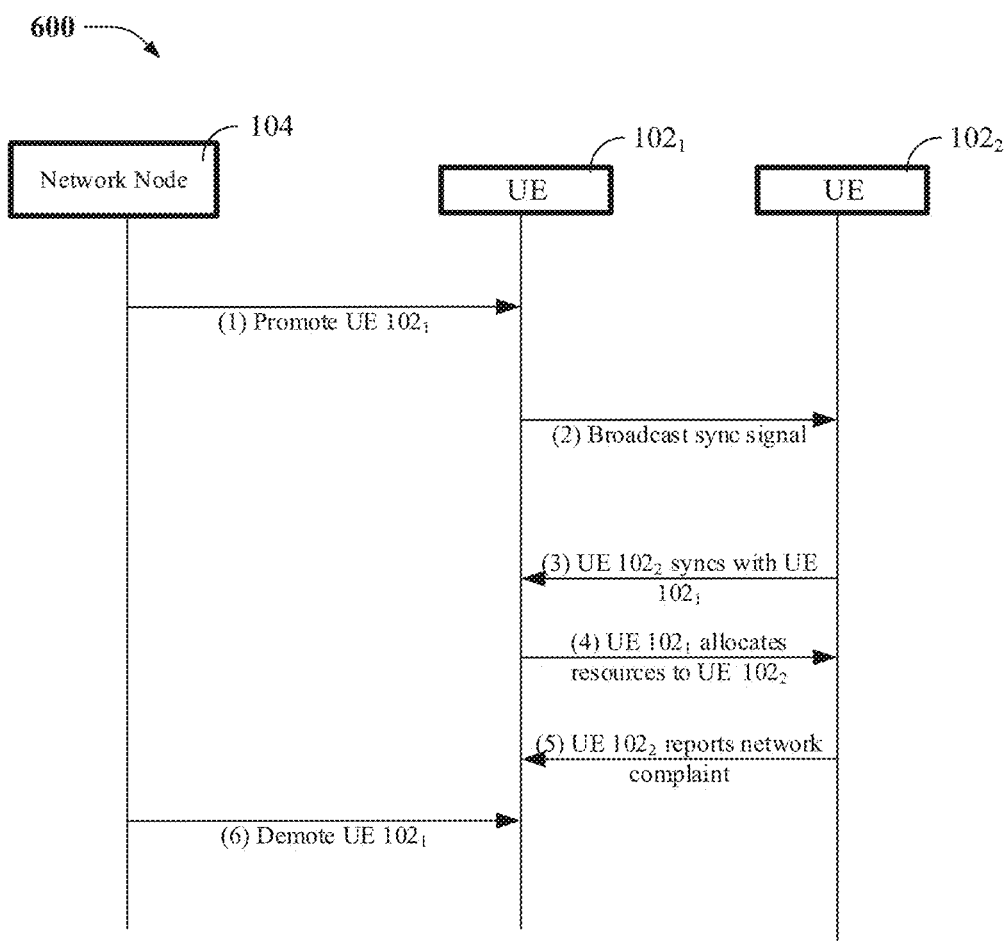
FIG. 6 illustrates an example sequence flow chart for local manager management according to one or more embodiments.

Referring now to FIG. 6, illustrated is an example sequence flow chart 600 for local manager management according to one or more embodiments. FIG. 6 depicts a sequence flow chart where the UE $102_1$ is promoted to a local manager in step (1) by the network node 104. Thereafter, the UE $102_1$ can broadcast a synchronization signal out the UE$102_2$ to indicate that the UE $102_1$ is available to allocate resources at step (2). Consequently, the UE $102_2$, can send a scheduling request signal to the UE $102_1$ to request resources from the UE $102_1$ at step (3). At step (4), the UE $102_1$ can allocate resources to the UE $102_2$, and at step (5), the UE $102_2$ can report this data back to the UE $102_1$. Furthermore, at step (6), the UE $102_1$ can be demoted by the network node 104.

Figure 7:
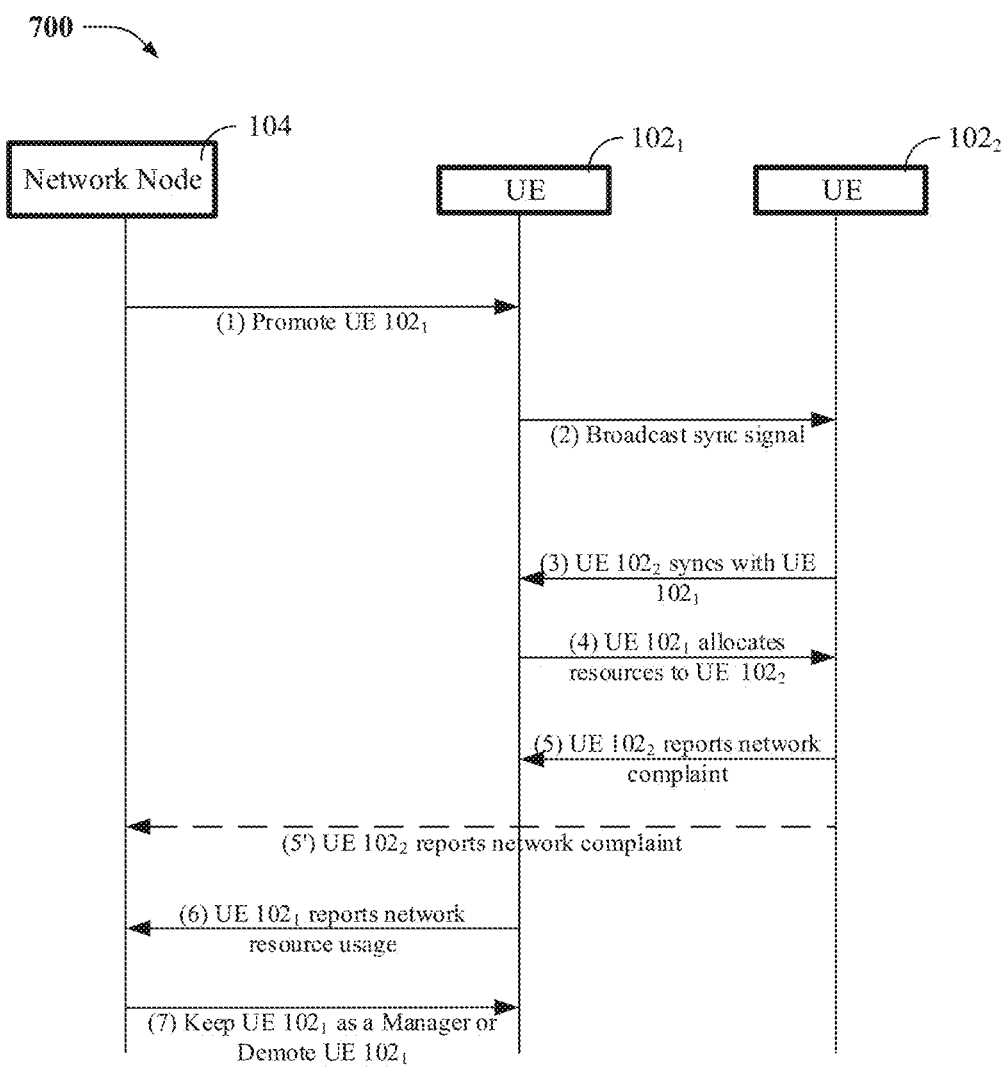
FIG. 7 illustrates an example sequence flow chart for local manager management according to one or more embodiments.

Referring now to FIG. 7, illustrated is an example sequence flow chart 700 for local manager management according to one or more embodiments. FIG. 7 depicts a sequence flow chart where the UE $102_1$ is promoted to a local manager in step (1) by the network node 104. Thereafter, the UE $102_1$ can broadcast a synchronization signal out the UE $102_2$ to indicate that the UE $102_1$ is available to allocate resources at step (2). Consequently, the UE $102_2$, can send a scheduling request signal to the UE $102_1$ to request resources from the UE $102_1$ at step (3). At step (4), the UE $102_1$ can allocate resources to the UE $102_2$, and at step (5), the UE $102_2$ can report this data back to the UE $102_1$. Additionally, at step (5'), the UE $102_2$ can report this data back to the network device 104. The UE $102_1$ can also report resource usage data to the network node 104 at step (6). Based on a comparison of the data from UE $102_1$ and UE $102_2$, the network node 104 can make the decision to let the UE $102_1$ remain as the local manager or demote the UE $102_1$ from the local manager and send a signal indicative of such to the UE $102_1$ at step (7).

Figure 8:
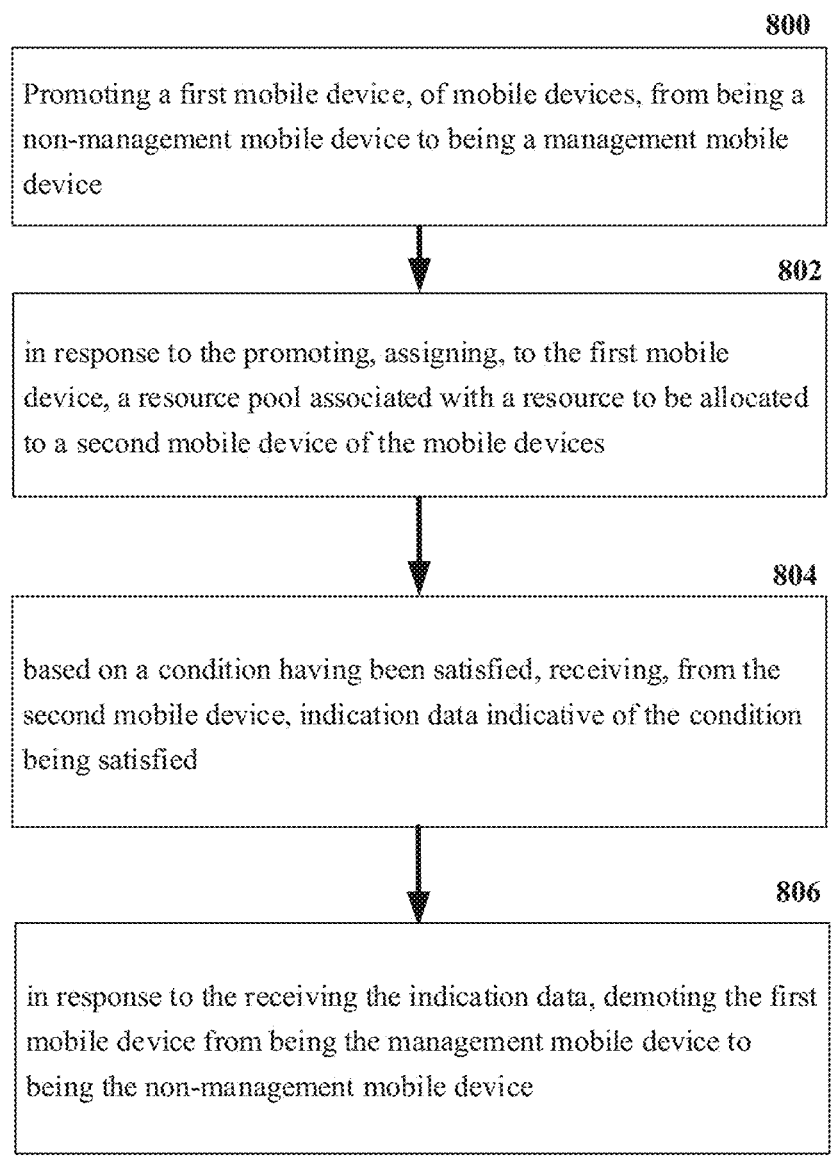
FIG. 8 illustrates an example flow diagram for a method for facilitating local manager management for a 5G network according to one or more embodiments.

Referring now to FIG. 8, illustrated is an example flow diagram for a method for facilitating local manager management for a 5G network according to one or more embodiments. At element 800, the method can comprise promoting (via the disposition component 208) a first mobile device (e.g., UE $102_1$), of mobile devices, from being a non-management mobile device to being a management mobile device. At element 802, in response to the promoting, the method can comprise assigning (e.g., via UE $102_1$) a resource pool associated with a resource to be allocated to a second mobile device (e.g., via UE $102_2$) of the mobile devices. Based on a condition having been satisfied, at element 804, the method can comprise receiving, from the second mobile device (e.g., via UE $102_2$), indication data indicative of the condition being satisfied. Additionally, in response to the receiving the indication data, the method can comprise demoting, (via the disposition component 208), the first mobile device (e.g., via UE $102_1$) from being the management mobile device to being the non-management mobile device.

Figure 9:
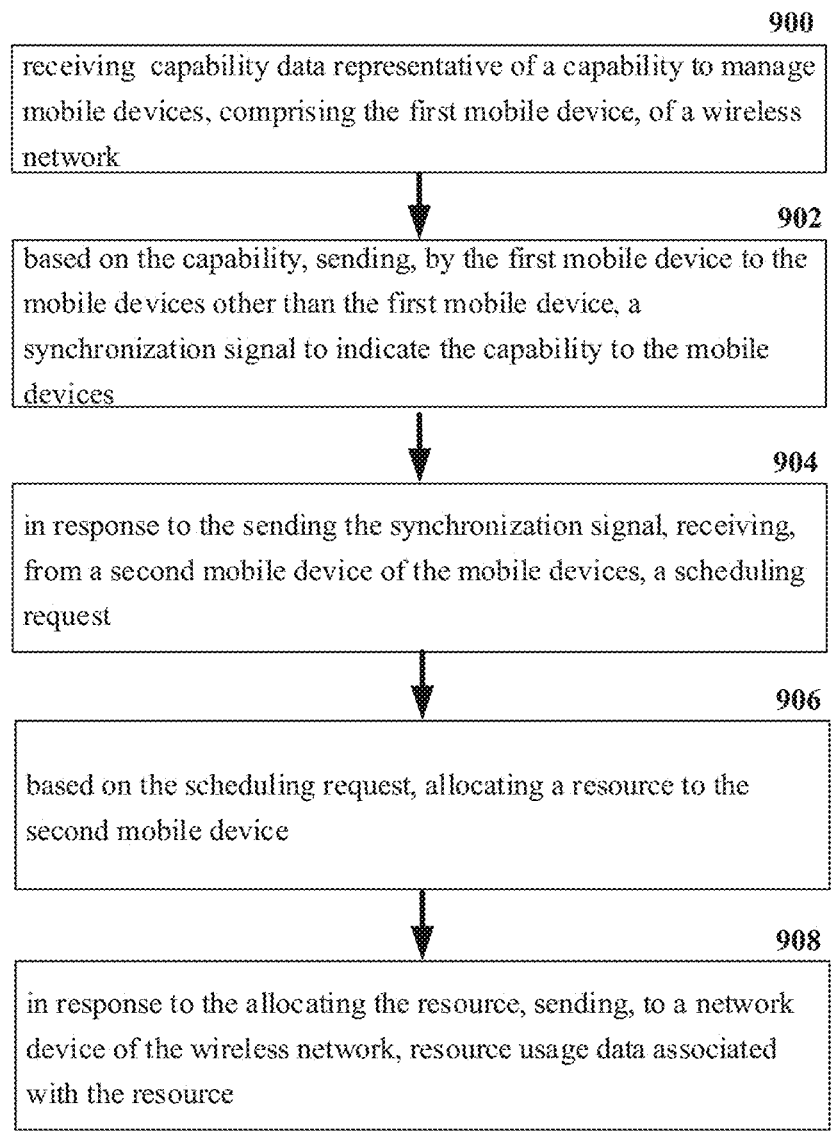
FIG. 9 illustrates an example flow diagram for a system for facilitating local manager management for a 5G network according to one or more embodiments.

Referring now to FIG. 9, illustrates an example flow diagram for a first mobile device for facilitating local management for a 5G network according to one or more embodiments. At element 900, the first mobile device (e.g., via UE $102_1$), can facilitate receiving, receiving capability data representative of a capability to manage mobile devices, comprising the first mobile device, of a wireless network. At element 902, based on the capability, the first mobile device can facilitate sending, by the first mobile device to the mobile devices other than the first mobile device, a synchronization signal to indicate the capability to the mobile devices. In response to the sending the synchronization signal, the first mobile device (e.g., via UE $102_1$) can facilitate receiving, from a second mobile device (e.g., via UE $102_2$) of the mobile devices, a scheduling request at element 904. Based on the scheduling request, the first mobile device (e.g., via UE $102_1$) can facilitate allocating a resource to the second mobile device (e.g., via UE $102_2$) at element 906. Furthermore, at element 908, in response to the allocating the resource, the first mobile device (e.g., via UE $102_1$) can facilitate sending, to a network device (e.g., network node 104) of the wireless network, resource usage data associated with the resource.

Figure 10:
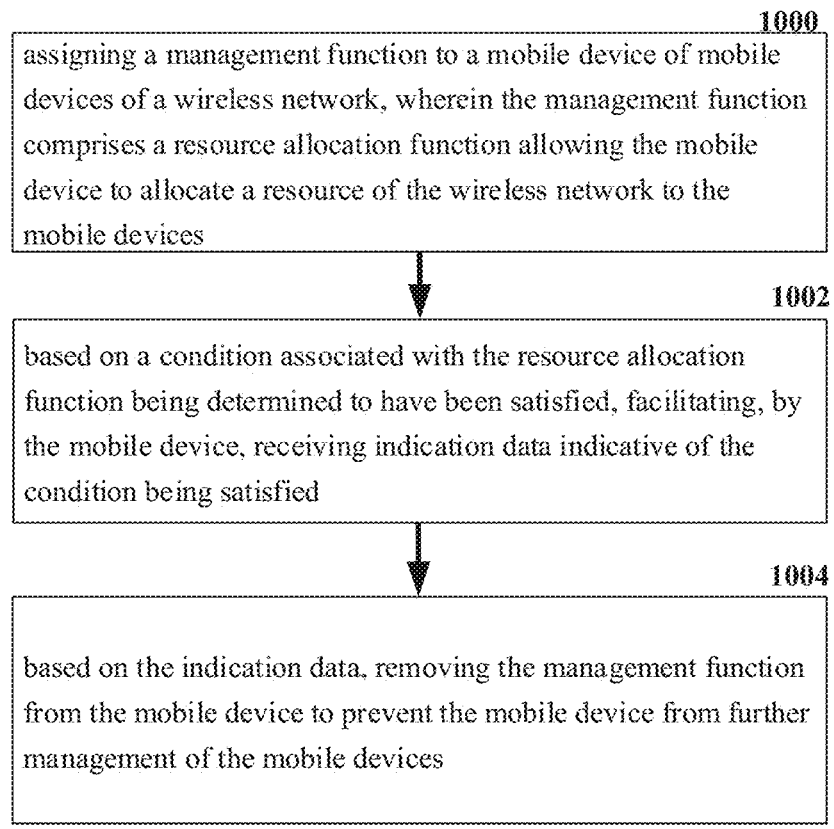
FIG. 10 illustrates an example flow diagram for a machine-readable medium for facilitating local manager management for a 5G network according to one or more embodiments.

Referring now to FIG. 10, illustrated is an example flow diagram for a machine-readable medium for facilitating local manager management for a 5G network according to one or more embodiments. At element 1000, a machine-readable storage medium can perform the operations comprising assigning a management function (e.g., via the disposition component 208) to a mobile device (e.g., via UE $102_1$) of mobile devices of a wireless network, wherein the management function comprises a resource allocation function allowing the mobile device (e.g., via UE $102_1$) to allocate a resource of the wireless network to the mobile devices (e.g., via UEs $102_2$, $102_3$). At element 1002, the machine-readable storage medium can perform the operations comprising facilitating, by the mobile device (e.g., via UE $102_1$), receiving indication data indicative of the condition being satisfied based on a condition associated with the resource allocation function being determined to have been satisfied. Additionally, based on the indication data, the machine-readable storage medium can perform the operations comprising removing the management function (e.g., via the disposition component 208) from the mobile device (e.g., via UE $102_1$) to prevent the mobile device (e.g., via UE $102_1$) from further management of the mobile devices (e.g., via UEs $102_2$, $102_3$) at element 1004.

Figure 11:
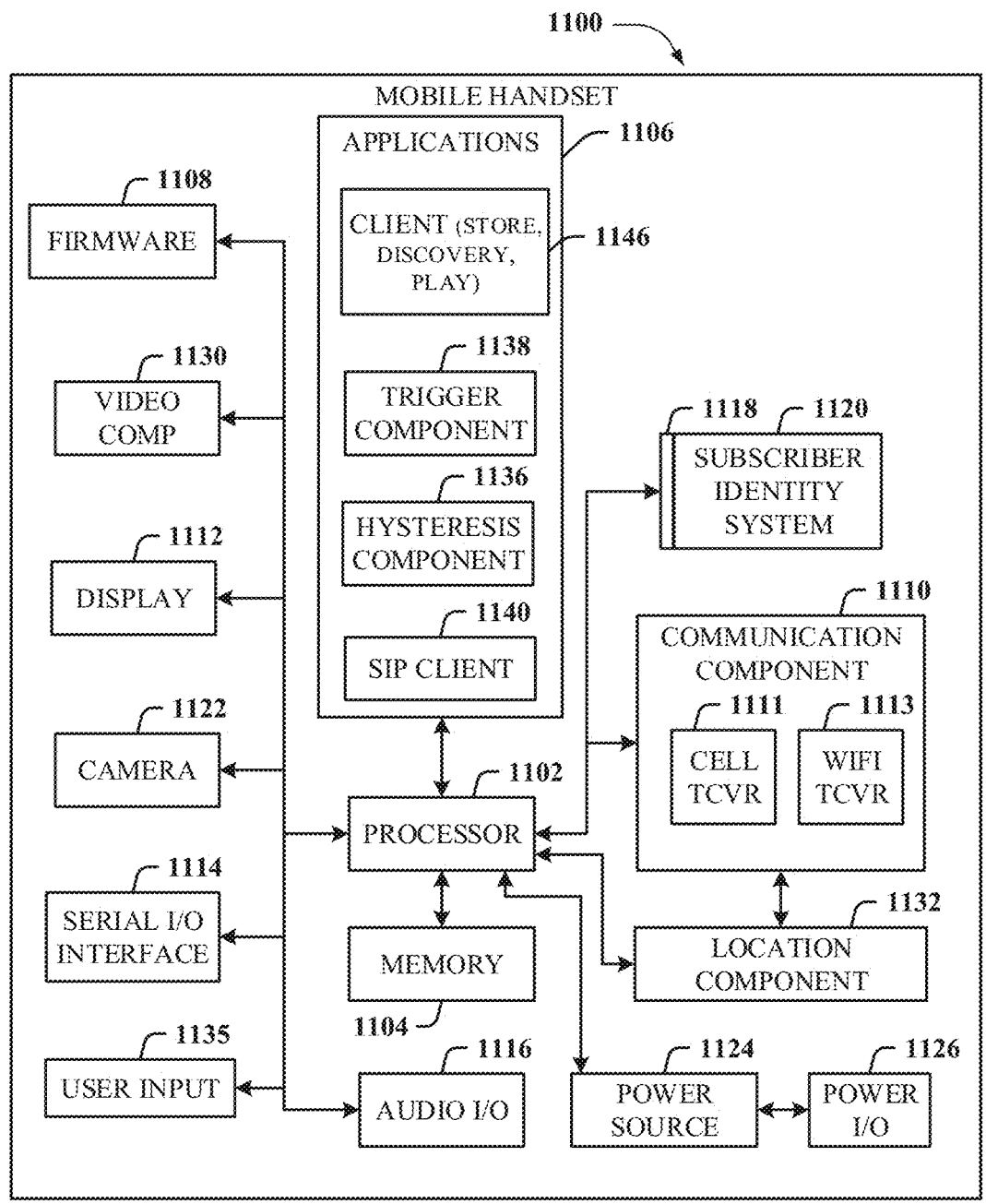
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
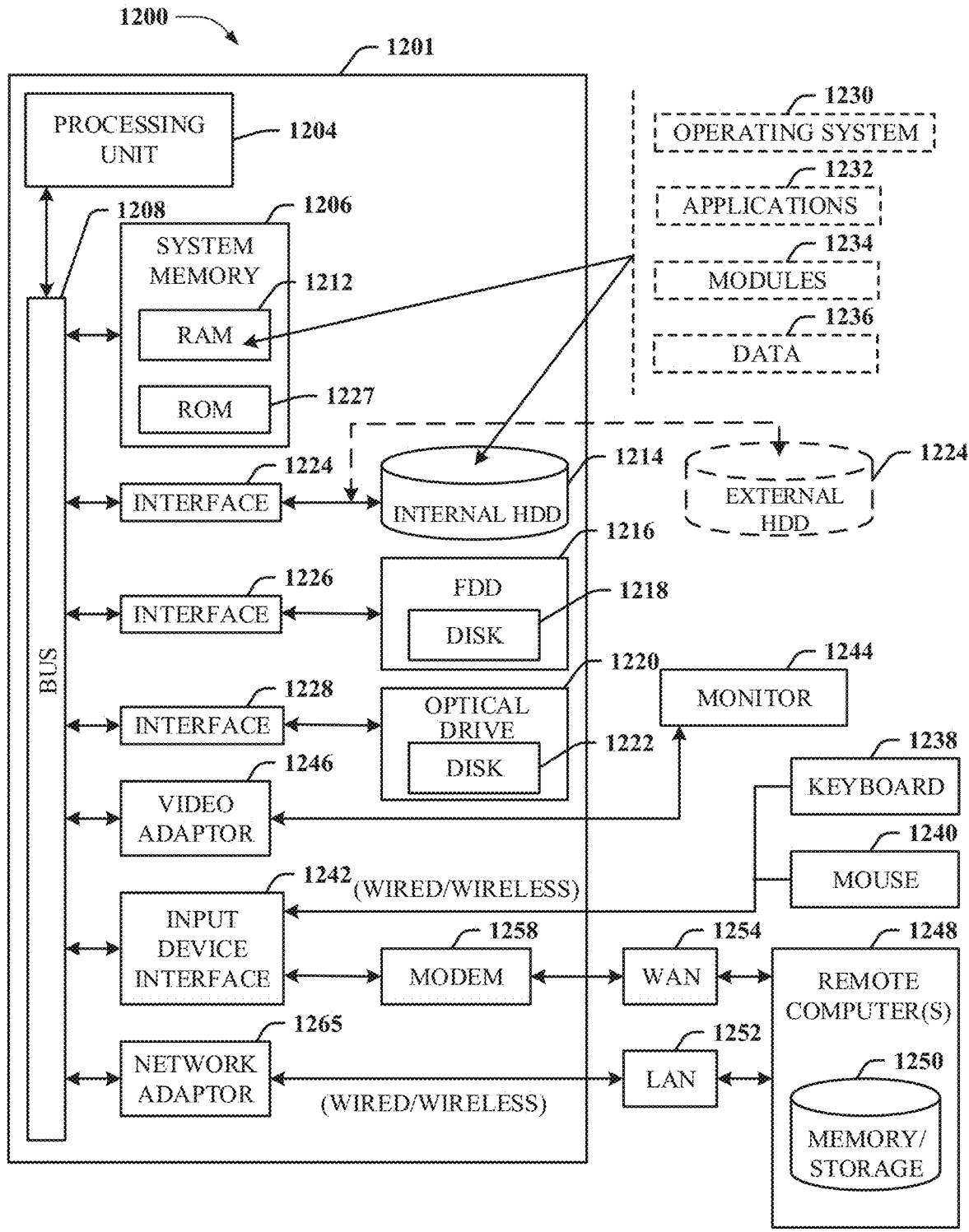
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   promoting, by network equipment comprising a processor, a first user equipment, of user equipment, from being a non-management user equipment to being a management user equipment;
   in response to promoting the first user equipment, assigning, by the network equipment to the first user equipment, a resource pool associated with a resource to be allocated to a second user equipment of the user equipment;
   based on a condition having been satisfied, receiving, by the network equipment from the second user equipment, indication data indicative of the condition being satisfied, wherein the condition having been satisfied comprises exceeding a threshold value representative of a number of the user equipment failing to have received the resource, of the resource pool, from the first user equipment; and
   in response to receiving the indication data, demoting, by the network equipment, the first user equipment from being the management user equipment to being the non-management user equipment.

2. The method of claim 1, wherein promoting the first user equipment to the management user equipment comprises conferring management capabilities to the first user equipment to manage the second user equipment.

3. The method of claim 2, wherein the management capabilities comprise a capability to assign the resource of the resource pool to the second user equipment.

4. The method of claim 1, wherein the condition having been satisfied comprises a failure of the first user equipment to have allocated the resource of the resource pool to the second user equipment.

5. The method of claim 4, wherein the condition having been satisfied comprises the condition having exceeded a time duration associated with the failure of the first user equipment to have allocated the resource of the resource pool to the second user equipment.

6. The method of claim 1, further comprising:
   in response to the demoting the first user equipment to being the non-management user equipment, promoting, by the network equipment, a third user equipment to being the management user equipment.

7. The method of claim 1, wherein the condition is associated with a number of failed scheduling requests from the user equipment.

8. A first user equipment, comprising:
   a processor; and
   a memory that stores executable instructions that, when executed by the processor, facilitate performance of operations, comprising:
   receiving capability data representative of a network capability to manage user equipment, comprising the first user equipment;
   based on the capability, sending, by the first user equipment to the user equipment other than the first user equipment, a synchronization signal to indicate the capability to the user equipment;
   in response to sending the synchronization signal, receiving, from a second user equipment of the user equipment, a scheduling request;
   based on the scheduling request, allocating a resource to the second user equipment;
   in response to allocating the resource, sending, to network equipment, resource usage data associated with the resource; and
   in response to the network equipment receiving failure data, from the second user equipment, indicative of the first user equipment failing to allocate a resource to the second user equipment, receiving, by the first user equipment, an indication that the capability to manage user equipment has been revoked.

9. The first user equipment of claim 8, wherein the network capability comprises a management capability to manage the second user equipment.

10. The first user equipment of claim 8, wherein receiving the indication that the network capability to manage user equipment has been revoked is in response to the network equipment comparing the resource usage data to the failure data.

11. The first user equipment of claim 8, wherein the resource usage data comprises scheduling data representative of a schedule for the allocating of the resource to the second user equipment.

12. The first user equipment of claim 11, wherein the scheduling data comprises channel state data associated with a channel between the first user equipment and the second user equipment.

13. The first user equipment of claim 8, wherein the resource usage data comprises a group of the user equipment for which the first user equipment comprises the network capability to service.

14. The first user equipment of claim 8, wherein the resource usage data comprises an estimated traffic volume associated with the user equipment of the network.

15. A non-transitory machine-readable medium, comprising executable instructions that, when executed by a processor, facilitate performance of operations, comprising:
    assigning a network management function to a mobile device of mobile devices, wherein the network management function comprises a resource allocation function allowing the mobile device to allocate a network resource to the mobile devices;

based on a condition associated with the resource allocation function being determined to have been satisfied, facilitating, by the mobile device, receiving indication data indicative of the condition being satisfied, wherein the condition having been satisfied comprises exceeding a threshold value representative of a number of the mobile devices failing to have received the network resource, of a resource pool, from the mobile device; and based on the indication data, removing the network management function from the mobile device to prevent the mobile device from further management of the mobile devices.

16. The non-transitory machine-readable medium of claim 15, wherein the condition evaluates a number of failed scheduling requests from the mobile devices.

17. The non-transitory machine-readable medium of claim 15, wherein the operations further comprise:

in response to receiving the indication data, facilitating, by the mobile device, reporting the indication data to network equipment, resulting in reported data.

18. The non-transitory machine-readable medium of claim 17, wherein the reported data comprises location data representative of locations of the mobile devices.

19. The non-transitory machine-readable medium of claim 17, wherein the mobile device is a first mobile device, and wherein the reported data comprises power data representative of power of a second mobile device of the mobile devices.

20. The non-transitory machine-readable medium of claim 17, wherein the reported data comprises resource allocation data representative of a resource allocation based on the resource allocation function.

* * * * *